United States Patent [19]
Fujita et al.

[11] 3,758,526
[45] Sept. 11, 1973

[54] PROCESS FOR PREPARATION OF B-CYANOETHYL ESTERS OF CARBOXYLIC ACIDS

[75] Inventors: Yasuhiro Fujita, Otake; Teijiro Morimoto, Iwakuni, both of Japan

[73] Assignee: Mitsui Petrochemical Industries, Ltd., Tokyo, Japan

[22] Filed: May 27, 1970

[21] Appl. No.: 41,043

[52] U.S. Cl. ............ 260/404, 260/464, 260/465 D, 260/465.4
[51] Int. Cl. ............................................. C09f 7/00
[58] Field of Search............ 260/404, 465 D, 465.4, 260/464

[56] References Cited
UNITED STATES PATENTS

| | | | |
|---|---|---|---|
| 3,461,167 | 8/1969 | Buehler et al. | 260/690 |
| 3,453,299 | 7/1969 | Claridge | 260/690 |
| 3,470,184 | 9/1969 | Prakash | 260/690 |
| 3,150,142 | 9/1964 | Eby | 260/558 R |

FOREIGN PATENTS OR APPLICATIONS

| | | | |
|---|---|---|---|
| 1,063,003 | 12/1953 | France | 260/465.4 |

OTHER PUBLICATIONS

Javaid et al., "Addn. of Carbox. Acids to Acrylonitrile" (1968) J. Chem. Eng. Data 13 pp. 596–597 (1968)

Semykal et al., "Propionitrile from Acrylonitrile" (1968) CA 70 No. 19612t. (1969)

Bruson, "Cyanoethylation" Chapt. 2 (1952) Organic Reactions, Wiley & Sons Inc., pp. 79–81, 86 86 & 97

*Primary Examiner*—Lewis Gotts
*Assistant Examiner*—G. Hollrah
*Attorney*—Sherman and Shalloway

[57] ABSTRACT

A process for the preparation of beta-cyanoethyl esters of carboxylic acids which comprises heating and reacting acrylonitrile and a carboxylic acid selected from the groups consisting of saturated aliphatic carboxylic acids having one to 20 carbon atoms, unsaturated aliphatic carboxylic acids having one to 20 carbon atoms, alicyclic carboxylic acids having six to 20 carbon atoms and aromatic carboxylic acids having seven to 20 carbon atoms in the presence of a copper derivative and metallic copper.

1 Claim, No Drawings

PROCESS FOR PREPARATION OF B-CYANOETHYL ESTERS OF CARBOXYLIC ACIDS

This invention relates to a process for the preparation of beta-cyanoethyl esters from acrylonitrile and carboxylic acids.

Beta-cyanoethyl esters of carboxylic acids are important chemicals as solvents, starting materials to be used for preparing high molecular weight compounds and intermediates leading to organic synthetic chemicals. For instance, beta-cyanoethyl acetate has a high ability of dissolving various organic chemicals and high molecular weight compounds such as polyacrylonitrile. Further, a beta-cyanoethyl ester of an alpha, beta-unsaturated carboxylic acid such as acrylic acid or methacrylic acid gives a characteristic high molecular weight substance by its homopolymerization or copolymerization with other comonomers. Beta-cyanoethyl esters of carboxylic acids have been heretofore prepared by reaction of ethylene cyanohydrin with a carboxylic acid or its chloride or a ketene. As to preparation of these starting materials, namely, ethylene cyanohydrin, carboxylic acid chlorides and ketenes some methods have been known. Each of these methods, however, is carried out on a laboratory scale and requires complicated operations, and no technique has been established capable of giving these starting materials in good yields at low costs on an industrial scale. Accordingly, it has been heretofore impossible to provide beta-cyanoethyl esters of carboxylic acids in great quantity at low costs. Further, the conventional methods are defective in that dehydration occurs during the reaction of ethylene cyanohydrin with a carboxylic acid and dehydrochlorination occurs during the reaction of ethylene cyanohydrin with a carboxylic acid chloride, and occurrence of such side reactions makes operational steps complicated. The method comprising reacting ethylene cyanohydrin with a ketene is also defective because this method is only applicable to the case where a starting material capable of forming a ketene is used. Accordingly, some kinds of beta-cyanoethyl esters cannot be prepared according to this method. For instance, beta-cyanoethyl esters of aromatic carboxylic acids cannot be prepared in accordance with this method.

We have made an intensive research with a view to developing a process which can produce beta-cyanoethyl esters of carboxylic acids by a simple operation with industrial advantages and found that beta-cyanoethyl esters of carboxylic acids can be prepared in good yields from acrylonitrile and carboxylic acids which are much cheaper than starting materials used in the conventional methods.

According to this invention a process is provided for the preparation of beta-cyanoethyl esters of carboxylic acids which comprises mixing acrylonitrile and a carboxylic acid and reacting them by heating.

The process of this invention will now be described in more detail.

Carboxylic acids to be used in this invention are saturated aliphatic carboxylic acids having one to 20 carbon atoms, unsaturated aliphatic carboxylic acids of three to 20 carbon atoms, alicyclic carboxylic acids having six to 20 carbon atoms and aromatic carboxylic acids having seven to 20 carbon atoms. More specifically, as the carboxylic acid there may be cited saturated aliphatic carboxylic acids such as acetic acid, propionic acid, butyric acid, capronic acid, capric acid, palmitic acid and stearic acid; unsaturated carboxylic acids such as acrylic acid, methacrylic acid, crotonic acid and oleic acid; aromatic carboxylic acids such as benzoic acid, tolylic acid and naphthalene carboxylic acid; and alicyclic acids such as cyclohexane carboxylic acid. Also polycarboxylic acids such as maleic acid, succinic acid, glutaric acid, adipic acid, phthalic acids, cyclohexane dicarboxylic acids and naphthalene dicarboxylic acids may be used. Carboxylic acids which have functional substituents such as halogen, hydroxyl, nitro, alkyl, alkoxy, aldehyde, ester and cyano groups may be used similarly.

In the process of this invention the molar ratio of acrylonitrile:carboxylic acid is in the range of from 5:95 to 95:5, preferably 20:80 to 80:20.

In the process of this invention the reaction between acrylonitrile and a carboxylic acid may be accomplished either in the absence of a catalyst or in the presence of a catalyst. In view of the reaction rate, the yield, the reaction temperature and other process conditions, however, it is desired to conduct the reaction in the presence of a catalyst.

In accordance with one embodiment of the process of this invention a mixture of acrylonitrile and a carboxylic acid is heated at a temperature of 100 to 300°C., preferably 150 to 250°C. to thereby react them. In this embodiment, in case the reaction temperature is lower than 100°C., the reaction rate is very low. Accordingly, adoption of such low temperature is disadvantageous. On the contrary, at a reaction temperature exceeding 300°C. polymers are formed in great quantity with a reduction of the yield of the intended product. Accordingly, adoption of such high temperature is also disadvantageous.

The second embodiment of the process of this invention comprises heating a mixture of acrylonitrile and a carboxylic acid at 50 to 300°C., preferably 80 to 250°C., in the presence of at least one metal compound as the catalyst to thereby react them. As the metal compound to be used as the catalyst oxides and hydroxides of metals selected from lithium, sodium, potassium, copper, silver, gold, magnesium, calcium, strontium, barium, zinc, cadmium, mercury, aluminum, gallium, thallium, germanium, tin, lead, titanium, zirconium, antimony, bismuth, vanadium, tantalum, chromium, manganese, iron, cobalt, nickel, molybdenum, ruthenium, rhodium, palladium, tungsten, and platinum; inorganic acid salts, such as halides, cyanides, borates, nitrates, sulfates, phosphates, carbonates and thiocyanate, of such metals; salts of such metals with organic carboxylic acids having one to 20 carbon atoms such as formic acid, acetic acid, propionic acid, butyric acid, lactic acid, oxalic acid, succinic acid, maleic acid, adipic acid, oleic acid and benzoic acid; and alcoholates of alcohols having one to eight carbon atoms such as ethylate, propylate, butyrate, glycolate and phenolate and acetylacetonates of such metals may be used. Complexes of such metal compounds with phosphines, amines, pyridyls and dipyridyls may be also used. Among these compounds, oxides, hydroxides, inorganic acid salts inclusive of halides, borates, nitrates, carbonates and sulfates, salts of organic acids inclusive of acetates, propionates, butyrates, benzoates, adipates, oxalates and succinates, and acetylacetonates, of copper, silver, cadmium, mercury, lead, chromium, iron, cobalt, nickel and palladium are preferably used. A mixture of two or more of these metal compounds may be used as the catalyst in this invention.

The amount of such catalyst is in the range of 0.01 to 20 percent by weight, preferably 0.1 to 10 percent by weight, based on the total amount of the mixture of acrylonitrile and a carboxylic acid.

The third embodiment of the process of this invention comprises heating a mixture of acrylonitrile and a carboxylic acid at 50 to 300°C., preferably 80 to 250°C., in the presence of metallic magnesium, iron or aluminum as the catalyst to thereby react them. A mixture of two or more of metallic magnesium, iron and aluminum may be also used in this embodiment. The amount of such metallic catalyst is in the range of 0.01 to 20 percent by weight, preferably 0.1 to 10 percent by weight, based on the total amount of the mixture of acrylonitrile and a carboxylic acid.

The forth embodiment of the process of this invention, which is the most preferable embodiment, comprises heating a mixture of acrylonitrile and a carboxylic acid at 50 to 300°C., preferably 80 to 250°C., in the presence of a mixture of metallic copper and a copper compound as the catalyst to thereby react acrylonitrile and the carboxylic acid. As the copper compound capable of exhibiting an excellent catalytic activity in the coexistence of metallic copper, copper oxide, copper hydroxide, salts of copper with inorganic acids such as copper halide, copper cyanide, copper nitrate, copper sulfate, copper phosphate, copper carbonate and copper thiocyanate, salts of copper with organic carboxylic acids having one to 20 carbon atoms such as formic acid, acetic acid, propionic acid, butyric acid, lactic acid, oxalic acid, maleic acid, adipic acid, oleic acid and benzoic acid, and copper alcoholates and acetylacetonate may be named. Complexes of these copper compounds with phosphines, amines, pyridyls and dipyridyls may be also used. No disadvantage is brought about by use of a mixture of two or more of these copper compounds or complexes. The amount of the catalyst composed of metallic copper and such copper compound is in the range of 0.01 to 20 percent by weight, preferably 0.1 to 10 percent by weight, based on the total amount of the mixture of acrylonitrile and a carboxylic acid. It is sufficient that the amount of metallic copper is more than 10 mole percent to the copper compound, and best results are obtained when the molar ratio of metallic copper to the copper compound is 0.5 to 1.5:1.

Among above-mentioned catalysts, a mixture of metallic copper and a copper compound is most effective as the catalyst. In case this type of the catalyst is used, the reaction rate is sufficiently high even at a relatively low reaction temperature and the intended product can be obtained in a good yield. The fact that the reaction may be carried out at a relatively low temperature not only gives economical advantages but also prohibits occurrence of undesired side reactions such as polymerization of acrylonitrile. It is surprising that although a single use of metallic copper provides no catalytic activity, when a mixture of metallic copper and a copper compound is used as the catalyst, a prominently excellent catalytic activity can be attained as compared with the case of a single use of metallic copper.

In the process of this invention the reaction is performed under atmospheric or superatomospheric pressure, the preferable pressure being in the range of from atmospheric pressure to 100 kg/cm$^2$ gauge. The reaction time is 0.5 to 25 hours, preferably 1 to 10 hours. In case the reaction pressure is too high or the reaction time is longer than 25 hours, undesired side-reactions such as polymerization of acrylonitrile occur. Accordingly, it is not desirable to conduct the reaction under too high a pressure or for too long a period of time.

Under reaction conditions adopted in the process of this invention, it sometimes happens that acrylonitrile polymerizes to form polyacrylonitrile and the yield and selectivity of the intended beta-cyanoethyl ester are lowered. Accordingly, in the practice of the process of this invention the polymerization of acrylonitrile is prevented by adding to the reaction system a commercially available radical polymerization inhibitor of a hydroquinone, phenol or amine type, or by using commercially available acrylonitrile in which such polymerization inhibitor has been incorporated. Thus it is possible to improve the yield and selectivity of the intended beta-cyanoethyl ester. A preferable amount of the polymerization inhibitor in the reaction system is in the range of $2 \times 10$ to $4 \times 10^3$ p.p.m. based on the weight of acrylonitrile.

Since such polymerization inhibitor frequently loses its activity upon reaction with oxygen, it is preferable to replace the air of the reaction system by an inert gas such as nitrogen, carbon dioxide gas or rate gas and conduct the reaction in such inert gas atmosphere.

In the process of this invention use of a solvent is not essential, but use of a solvent inert to the reactants is possible. In case a beta-cyanoethyl ester of a carboxylic acid having a poor solubility in acrylonitrile such as isophthalic or terephthalic acid is prepared, it is advantageous to use solvents inert to the reactants. As such inert solvents aliphatic and aromatic hydrocarbons, halogenated hydrocarbons, nitriles, pyridyls and esters may be cited.

Beta-cyanoethyl esters prepared in accordance with the process of this invention may be separated and purified after completion of the reaction by customary procedures such as distillation, recrystalization and extraction.

The process of this invention can be carried out either continuously or batchwise.

In accordance with the process of this invention it is possible to produce all types of beta-cyanoethyl esters of carboxylic acids in high yields and at low costs by an extremely simple operation.

The process of this invention will now be described in more detail by referring to the following examples.

Example 1

An autoclave was charged with 24 g of acrylonitrile, 20 g of acetic acid and 0.05 g of hydroquinone, and the atmosphere inside the autoclave was replaced by nitrogen. Then the mixture was heated at 210°C. for 12 hours. After completion of the reaction, the autoclave was cooled and the reaction mixture was subjected to distillation to obtain 38.0 g of a low boiling fraction boiling at 70 – 130°C./760 mm Hg and 4.8 g of a high boiling fraction boiling at 135 – 136°C./58 mm Hg. There remained 0.5 g of a brown viscous residue. As a result of gas chromatography of the low boiling fraction it was found that the fraction was composed of 20.9 g of unreacted acrylonitrile and 17.1 g of unreacted acetic acid. As a result of elementary analysis it was found that the high boiling fraction was composed of 53.08 percent carbon, 6.24 percent hydrogen and 12.11 percent nitrogen, and the molecular weight thereof determined by the cryoscopic method was 118. Based on these results the empirical formula of the compound was determined as $C_5H_7NO_2$. At the infrared absorption analysis of the compound the existence of the nitrile group (2268 cm$^{-1}$), the esteric carbonyl group (1746 cm$^{-1}$) and the esteric ether linkage (1237 cm$^{-1}$) was comfirmed. Accordingly, the compound was determined to be beta-cyanoethyl acetate ($CH_3COOCH_2CH_2CN$; molecular weight = 113). The yield of beta-cyanoethyl acetate based on the amount used of acetic acid was 12.8 percent.

The low boiling fraction was charged again in the autoclave and heated at 210°C. for 12 hours. Some 5.1 g of beta-cyanoethyl acetate were obtained. The yield of beta-cyanoethyl acetate was 15.8 percent based on acetic acid.

Example 2

An autoclave was charged with 21 g of acrylonitrile, 30 g of acetic acid and 0.05 g of hydroquinone, and the atmosphere inside the autoclave was replaced by nitrogen. Then the mixture was heated at various temperatures indicated in Table 1 for a prescribed period of time. After completion of the reaction the gas chromatography analysis of the reaction product was conducted. The yields of resulting beta-cyanoethyl acetate in each run are shown in Table 1.

TABLE 1

| Reaction temperature (°C.) | Reaction time (hours) | Yield of beta-cyanoethyl acetate (%) |
|---|---|---|
| 80 | 48 | 0.7 |
| 120 | 48 | 3.2 |
| 180 | 24 | 4.8 |
| 200 | 24 | 10.6 |
| 220 | 12 | 16.2 |
| 230 | 12 | 18.1 |
| 250 | 6 | 13.6* |

* Formation of a small amount of polymer was observed.

Example 3

An autoclave was charged with 31.8 g (0.6 mole) of acrylonitrile, 0.2 mole of a carboxylic acid indicated in Table 2 and 0.05 g of hydroquinone, and the air inside the autoclave was replaced by nitrogen. Then the mixture was heated at 220°C. for 12 hours, followed by distillation of the reaction mixture. Yields of beta-cyanoethyl esters obtained in each run are shown in Table 2.

TABLE 2

| Carboxylic acid (grams) | Yield of beta-cyanoethyl ester (%) |
|---|---|
| Propionic acid (14.4) | 12.1 |
| Butyric acid (16.8) | 14.3 |
| Capric acid (34.4) | 8.6 |
| Stearic acid (57.0) | 7.2 |
| Acrylic acid (14.4) | 16.7 |
| Benzoic acid (24.4) | 9.6 |
| p-Chlorobenzoic acid (31.2) | 11.1 |
| p-Nitrobenzoic acid (33.4) | 13.0 |
| Adipic acid (29.2) | 10.1 |
| Cyclohexane carboxylic acid (25.6) | 21.8 |
| Phthalic acid (33.2) | 10.4 |
| Glutaric acid (26.4) | 9.9 |
| Naphthalenedicarboxylic acid (43.2) | 12.2 |

Example 4

An autoclave was charged with 21.2 g of acrylonitrile, 33.2 g of terephthalic acid, 20 g of pyridine and 0.05 g of hydroquinone, and the air inside the autoclave was replaced by nitrogen. Then the mixture was heated at 210°C. for 24 hours. The reaction mixture was subjected to distillation to remove 16.8 g of unreacted acrylonitrile and 19.3 g of pyridine, and the residue was extracted with ethanol. The extracted liquor was subjected to distillation to remove ethanol. Some 4.6 g of beta-cyanoethyl monoester of terephthalic acid having a melting point of 202 - 204°C were attained. The yield of the ester was 10.5 percent based on terephthalic acid.

Example 5

An autoclave was charged with 30 g of acrylonitrile, 20 g of acetic acid, 0.05 g of hydroquinone and a metal compound indicated in Table 3, and the air inside the system was replaced by nitrogen. Then the mixture was heated at 170°C. for 6 hours. In each run the reaction mixture was analyzed by gas chromatography and the yield of beta-cyanoethyl acetate was determined. Results are shown in Table 3.

Table 3

| Metal compound | Amount used (%) | Yield (%) |
|---|---|---|
| Lithium acetate | 1.0 | 12.5 |
| Sodium carbonate | 1.5 | 26.7 |
| Gold cyanide | 1.0 | 10.6 |
| Magnesium hydroxide | 1.6 | 10.3 |
| Cadmium acetate | 2.5 | 34.8 |
| Thallium acetate | 1.8 | 19.2 |
| Tin (II) chloride | 2.2 | 18.3 |
| Chromium acetate | 2.4 | 43.6 |
| Chromium (III) propionate | 2.0 | 39.3 |
| Chromium (III) butyrate | 2.2 | 37.0 |
| Ruthenium trichloride | 0.8 | 20.6 |
| Rhodium trichloride | 1.0 | 26.5 |
| Potassium platinic chloride | 1.0 | 20.3 |
| Copper naphthenate | 2.0 | 32.6 |
| Lead (II) oxalate | 2.0 | 26.2 |

Example 6

An autoclave was charged with 25 g of acrylonitrile, 30 g of acrylic acid, 0.05 g of hydroquinone and a metal compound indicated in Table 4 and the mixture was heated at 160°C. for 8 hours under nitrogen atmosphere. The yields of beta-cyanoethyl acrylate obtained in each run are shown in Table 4.

TABLE 4

| Metal compound | Amount used (g) | Yield (%) |
|---|---|---|
| Potassium acetate | 1.2 | 22.3 |
| Calcium acetate | 1.9 | 10.8 |
| Strontium acetate | 2.3 | 15.5 |
| Barium acetate | 3.0 | 19.2 |
| Gallium oxide | 1.0 | 18.2 |
| Zirconium oxychloride | 1.0 | 10.6 |
| Aluminum trioxide | 1.8 | 7.2 |
| Nickel acetate | 2.6 | 41.4 |
| Palladium cyanide | 1.2 | 36.0 |
| Titanium butyrate | 3.8 | 20.1 |
| Copper naphthenate | 2.0 | 33.2 |
| Mercury (I) sulphate | 2.5 | 31.2 |

Example 7

A mixture of 20 g of acrylonitrile, 31 g of benzoic acid, 0.05 g of hydroquinone and a metal compound indicated in Table 5 was reacted at 200°C. for 5 hours under nitrogen atmosphere. Yields of beta-cyanoethyl benzoate obtained in each run are shown in Table 5.

TABLE 5

| Metal compound | Amount used (g) | Yield (%) |
|---|---|---|
| Copper sulfate | 1.1 | 34.1 |
| Silver bromide | 2.3 | 27.3 |
| Silver nitrate | 1.5 | 38.8 |
| Zinc acetate | 2.0 | 11.0 |
| Mercury (I) chloride | 4.0 | 20.3 |
| Germanium oxide | 2.0 | 18.7 |
| Palladium acetate | 3.7 | 28.4 |
| Bismuth trichloride | 1.5 | 16.7 |
| Antimony acetate | 2.8 | 11.5 |
| Vanadium pentaoxide | 0.9 | 20.8 |
| Manganese acetate | 1.8 | 17.6 |

| | | |
|---|---|---|
| Molybdenum oxide | 1.4 | 22.1 |
| Iron (III) chloride | 1.1 | 19.3 |
| Dichloro-bis(triphenylphosphine) cobalt (II) | 4.2 | 33.1 |
| Tris(dipyridyl) cobalt (II) bromide | 3.0 | 26.0 |

Example 8

A mixture of 30 g of acrylonitrile, 20 g of acetic acid, 0.03 g of hydroquinone and a metal compound indicated in Table 6 was reacted at 130°C. for 2 hours under nitrogen atmosphere. The yields of beta-cyanoethyl acetate obtained in each run are shown in Table 6.

TABLE 6

| Metal compound | Amount used (g) | Yield (%) |
|---|---|---|
| Copper (II) hydroxide | 0.5 | 20.0 |
| Copper (II) carbonate | 0.6 | 21.3 |
| Copper (I) chloride | 0.5 | 13.6 |
| Copper (II) sulfate | 0.40 | 15.9 |
| Copper (III) acetate | 0.9 | 16.2 |

Example 9

A mixture of 30 g of acrylonitrile, 20 g of a carboxylic acid indicated in Table 7, 0.01 g of hydroquinone and a metal compound indicated in Table 7 was heated at 170°C. for 6 hours under nitrogen atmosphere. In each run the reaction mixture was analyzed by gas chromatography. The yields of the beta-cyanoethyl esters obtained in each run are shown in Table 7.

TABLE 7

| Carboxylic acid | Metal compound (amount added ; g) | Yield (%) |
|---|---|---|
| Methacrylic acid | Lead (II) benzoate (2.0) | 22.3 |
| Methacrylic acid | Cadmium succinate (2.0) | 25.3 |
| Methacrylic acid | Lead (II) adipate (2.0) | 24.0 |
| Methacrylic acid | Cobalt (II) borate (1.2) | 20.2 |
| Butyric acid | Iron (II) oxalate (1.5) | 28.2 |
| Butyric acid | Cobalt acetylacetonate (1.8) | 23.3 |
| Butyric acid | Nickel oxalate (1.5) | 29.6 |
| Butyric acid | Mercury (I) sulfate (2.5) | 26.6 |

Example 10

A mixture of 30 g of acrylonitrile, 20 g of acetic acid, 0.05 g of hydroquinone, 0.8 g of cobalt acetate and 0.7 g of lead acetate was heated at 150°C. for 6 hours under nitrogen atmosphere. As a result of the gas chromatography analysis of the reaction mixture it was confirmed that the yield of beta-cyanoethyl acetate was 23.8 percent.

Example 11

A mixture of 20 g of acrylonitrile, 0.05 g of hydroquinone, 1.2 g of cobalt benzoate and 30 g of a carboxylic acid indicated in Table 8 was heated at 170°C. for 6 hours under nitrogen atmosphere. Yields of beta-cyanoethyl esters obtained in each run are shown in Table 8.

TABLE 8

| Carboxylic acid | Yield (%) |
|---|---|
| Butyric acid | 28.9 |
| Capric acid | 20.2 |
| p-Chlorobenzoic acid | 33.7 |
| p-Methoxybenzoic acid | 29.0 |
| Adipic acid | 19.3 |
| Cyclohexane carboxylic acid | 25.6 |
| Phthalic acid | 12.6 |
| Naphthalenedicarboxylic acid | 18.2 |

Example 12

A mixture of 30 g of acrylonitrile, 20 g of acetic acid, 0.05 g of hydroquinone, 1.6 g of cobalt acetate and 20 g of a solvent indicated in Table 9 was heated at 180°C. for 6 hours under nitrogen atmosphere. Yields of beta-cyanoethyl acetate obtained in each run are shown in Table 9.

TABLE 9

| Solvent | Yield (%) |
|---|---|
| Hexane | 20.6 |
| Benzene | 23.1 |
| Chlorobenzene | 27.6 |
| Acetonitrile | 28.0 |
| beta-Cyanoethyl acetate | 33.6 |

Example 13

A mixture of 25 g of acrylonitrile, 30 g of acrylic acid, 0.05 g of hydroquinone and 0.7 g of metallic magnesium in an autoclave was heated at 160°C. for 8 hours under nitrogen atmosphere. Beta-cyanoethyl acrylate was obtained in a yield of 11.8 percent.

Example 14

An autoclave was charged with 30 g of acrylonitrile, 20 g of a carboxylic acid indicated in Table 10, 0.03 g of hydroquinone and 0.7 g of iron powder, and the mixture was heated at 180°C. for 4 hours under nitrogen atmosphere. In each run the reaction mixture was analyzed by gas chromatography and the yield of the resulting beta-cyanoethyl ester was determined. The results are shown in Table 10.

Table 10

| Carboxylic acid | Yield (%) of beta-cyanoethyl ester |
|---|---|
| Acetic acid | 10.6 |
| Butyric acid | 15.8 |
| Benzoic acid | 22.0 |

Example 15

An autoclave was charged with 30 g of acrylonitrile, 20 g of carboxylic acid indicated in Table 11, 0.8 g of aluminum powder and 0.03 g of hydroquinone, and the mixture was heated at 200°C. for 5 hours under nitrogen atmosphere. The reaction mixture was analyzed by gas chromatography and the yield of the resulting beta-cyanoethyl ester was determined. The results are shown in Table 11.

TABLE 11

| Carboxylic acid | Yield (%) of beta-cyanoethyl ester |
|---|---|
| Methacrylic acid | 20.2 |
| Propionic acid | 21.3 |
| Isobutyric acid | 25.6 |

Example 16

An autoclave was charged with 30 g of acrylonitrile, 20 g of acetic acid, 0.03 g of hydroquinone and a mixture of metallic copper and a copper compound indicated in Table 12, and the air inside the system was replaced by nitrogen. Then the mixture was heated at 130°C. for 2 hours. After completion of the reaction, the reaction mixture was analyzed by gas chromatography and the yield of beta-cyanoethyl ester was determined. Results are shown in Table 12.

TABLE 12

| Catalyst (grams) | Yield (%) |
|---|---|
| Copper (II) oxide(0.40)-metallic copper(0.32) | 63.4 |
| Copper (II) hydroxide(0.50)-metallic copper(0.32) | 72.0 |
| Copper (II) carbonate(0.60)-metallic copper(0.20) | 73.3 |
| Copper (I) chloride(0.50)-metallic | |

| | |
|---|---|
| copper(0.32) | 70.5 |
| Copper (II) cyanide(0.60)-metallic copper(0.32) | 65.1 |
| Copper (II) nitrate(0.60)-metallic copper(0.32) | 52.6 |
| Copper (II) sulfate(0.40)-metallic copper(0.32) | 51.0 |
| Copper (II) phosphate(1.5)-metallic copper(0.32) | 53.1 |
| Copper (II) formate(0.6)-metallic copper(0.32) | 70.6 |
| Copper (II) acetate(0.9)-metallic copper(0.32) | 71.5 |
| Copper (II) citrate(1.80)-metallic copper(0.32) | 68.3 |
| Copper (II) naphthenate(2.0)-metallic copper(0.32) | 65.0 |
| Copper (II) oleate(3.0)-metallic copper(0.32) | 60.8 |
| Copper (II) benzoate(1.5)-metallic copper(0.32) | 67.3 |
| Copper (II) acetylacetonate(0.8)-metallic copper(0.32) | 69.3 |

Example 17

A mixture of 30 g of acrylonitrile, 20 g of acrylic acid, 0.03 g of hydroquinone, 2.0 g of a copper (II) chloride-triphenyl phosphine complex and 0.32 g of metallic copper was heated at 120°C. for 2 hours under nitrogen atmosphere. Beta-cyanoethyl acrylate was obtained in a yield of 50%.

Example 18

A mixture of 30 g of acrylonitrile, 2.0 g of copper naphthenate, 0.03 g of hydroquinone, 0.32 g of metallic copper and a carboxylic acid indicated in Table 13 was heated at 135°C. for 4 hours under nitrogen atmosphere. The reaction mixture was analyzed by gas chromatography to determine the yield of the resulting beta-cyanoethyl ester. The results are shown in Table 13.

TABLE 13

| Carboxylic acid | Amount used (g) | Yield (%) |
|---|---|---|
| Butyric acid | 25 | 68.3 |
| Capric acid | 12 | 56.0 |
| Oleic acid | 18 | 52.8 |
| Benzoic acid | 20 | 58.1 |
| p-Chlorobenzoic acid | 28 | 62.8 |
| p-Methoxybenzoic acid | 11 | 58.5 |
| Adipic acid | 20 | 46.9 |
| Cyclohexane carboxylic acid | 10 | 61.7 |
| Phthalic acid | 16 | 49.2 |
| Methacrylic acid | 20 | 70.4 |

Example 19

A mixture of 30 g of acrylonitrile, 20 g of acetic acid, 2.0 g of a copper (II) chloride-dipyridyl complex, 0.32 g of metallic copper, 0.03 g of hydroquinone and 20 g of a solvent indicated in Table 19 was heated at 130°C. for 3 hours under nitrogen atmosphere. The yields of beta-cyanoethyl acetate obtained in each run are shown in Table 19.

TABLE 19

| Solvent | Yield (%) |
|---|---|
| Hexane | 63.2 |
| Benzene | 68.9 |
| Chlorobenzene | 67.0 |
| Acetonitrile | 72.5 |
| beta-Cyanoethyl acetate | 70.7 |

Example 20

A mixture of 30 g of acrylonitrile, 26 g of methacrylic acid, 0.03 g of hydroquinone, 0.4 g of copper carbonate, 0.2 g of copper hydroxide and 0.32 g of metallic copper was heated and refluxed under nitrogen atmosphere at 80°C. for 5 hours. The reaction mixture was distilled to obtain 29.2 g of beta-cyanoethyl methacrylate having a boiling point of 81 – 83°C./1 mm Hg. The yield was 70 percent.

What we claim is:

1. In a process for the preparation of β-cyanoethyl esters of carboxylic acids which comprises heating and reacting at a temperature of 80°C to 250°C for a period of 1 to 10 hours acrylonitrile and a carboxylic acid at a molar ratio of acrylonitrile to carboxylic acid of 5:95 to 95:5, said carboxylic acid being selected from the group consisting of saturated aliphatic hydrocarbyl carboxylic acids having one to 20 carbon atoms, unsaturated aliphatic hydrocarbyl carboxylic acids having three to 20 carbon atoms, cyclohexane carboxylic acid, carbocyclic carboxylic acids having seven to 20 carbon atoms and polycarboxylic acids selected from maleic acid, succinic acid, glutaric acid, adipic acid, phthalic acids, cyclohexane dicarboxylic acids and naphthalene dicarboxylic acids, said carboxylic acids optionally being substituted with a group selected from halogen, hydroxyl, nitro, methyl, methoxy, and cyano groups, in the presence of a catalytic amount of a catalyst consisting essentially of (A) at least one member selected from the group consisting of oxide, hydroxide, inorganic acid salts, organic acid salts, and acetylacetonate of copper and their complexes with phosphines, amines, pyridyls and dipyridyls, the improvement wherein the reaction is carried out in the copresence of catalyst component (B) metallic copper, the molar ratio of (B) to (A) being 0.5 – 1.5:1.

* * * * *

UNITED STATES PATENT OFFICE
CERTIFICATE OF CORRECTION

Patent No. 3,758,526      Dated September 11, 1973

Inventor(s) YASUHIRO FUJITA ET AL

It is certified that error appears in the above-identified patent and that said Letters Patent are hereby corrected as shown below:

Applicants hereby claim priority of:

| | | |
|---|---|---|
| Japan | Patent Application No. 43236/69 | filed June 4, 1969 |
| Japan | Patent Application No. 4415/70 | filed January 19, 1970 |
| Japan | Patent Application No. 4416/70 | filed January 19, 1970 |
| Japan | Patent Application No. 4417/60 | filed January 19, 1970 |

Signed and sealed this 12th day of March 1974.

(SEAL)
Attest:

EDWARD M. FLETCHER, JR.
Attesting Officer

C. MARSHALL DANN
Commissioner of Patents